(12) United States Patent
Suzuki et al.

(10) Patent No.: US 11,942,663 B2
(45) Date of Patent: Mar. 26, 2024

(54) TERMINAL COMPONENT AND SECONDARY BATTERY

(71) Applicant: PRIME PLANET ENERGY & SOLUTIONS, INC., Tokyo (JP)

(72) Inventors: Kosuke Suzuki, Toyota (JP); Takahiro Sakurai, Nagoya (JP)

(73) Assignee: Prime Planet Energy & Solutions, Inc., Tokyo (JP)

( * ) Notice: Subject to any disclaimer, the term of this patent is extended or adjusted under 35 U.S.C. 154(b) by 134 days.

(21) Appl. No.: 17/561,176

(22) Filed: Dec. 23, 2021

(65) Prior Publication Data

US 2022/0223985 A1    Jul. 14, 2022

(30) Foreign Application Priority Data

Jan. 13, 2021    (JP) ................. 2021-003789

(51) Int. Cl.
| | |
|---|---|
| *H01M 50/557* | (2021.01) |
| *H01M 50/103* | (2021.01) |
| *H01M 50/147* | (2021.01) |
| *H01M 50/562* | (2021.01) |
| H01M 10/0525 | (2010.01) |

(52) U.S. Cl.
CPC ....... *H01M 50/557* (2021.01); *H01M 50/103* (2021.01); *H01M 50/147* (2021.01); *H01M 50/562* (2021.01); *H01M 10/0525* (2013.01); *H01M 2200/103* (2013.01)

(58) Field of Classification Search
CPC . H01M 50/557; H01M 50/103; H01M 50/147
See application file for complete search history.

(56) References Cited

U.S. PATENT DOCUMENTS

| | | | |
|---|---|---|---|
| 2004/0092167 A1 | 5/2004 | Barrault et al. | |
| 2010/0248029 A1* | 9/2010 | Butt | H01M 10/647 |
| | | | 429/211 |
| 2012/0148884 A1 | 6/2012 | Kim | |
| 2013/0084471 A1 | 4/2013 | Han et al. | |
| 2014/0113164 A1 | 4/2014 | Nagata | |
| 2014/0178746 A1 | 6/2014 | Ono | |
| 2015/0318519 A1 | 11/2015 | Tsutsumi et al. | |

(Continued)

FOREIGN PATENT DOCUMENTS

| | | |
|---|---|---|
| CN | 106356475 A | 1/2017 |
| CN | 111384355 A | 7/2020 |

(Continued)

*Primary Examiner* — Kenneth J Douyette
(74) *Attorney, Agent, or Firm* — Finnegan, Henderson, Farabow, Garrett & Dunner, LLP

(57) ABSTRACT

A terminal component includes a first metal and a second metal overlapped on the first metal, the first metal having a part to be connected to an internal terminal, and the second metal having a part to be exposed to the outside of a battery case. At an interface where the first metal and the second metal are overlapped, one of the first metal and the second metal has a protrusion having a flat top portion. The other metal is joined to the top portion. A cross section of the protrusion orthogonal to a projection direction of the protrusion is set such that fusing occurs when a current equal to or higher than a predetermined current value flows between the first metal and the second metal.

3 Claims, 3 Drawing Sheets

(56) References Cited

U.S. PATENT DOCUMENTS

| | | |
|---|---|---|
| 2015/0318584 A1 | 11/2015 | Yebka et al. |
| 2016/0043353 A1 | 2/2016 | Tsutsumi et al. |
| 2017/0018759 A1 | 1/2017 | Guen |
| 2017/0162852 A1 | 6/2017 | Guen |
| 2019/0006717 A1 | 1/2019 | Wakimoto et al. |
| 2020/0212415 A1 | 7/2020 | Muroya et al. |

FOREIGN PATENT DOCUMENTS

| | | |
|---|---|---|
| EP | 2 506 358 A1 | 10/2012 |
| JP | 2008-177084 A | 7/2008 |
| JP | 2011-124024 A | 6/2011 |
| JP | 2013-077546 A | 4/2013 |
| JP | 2013-239398 A | 11/2013 |
| JP | 2014-086177 A | 5/2014 |
| JP | 2014-127277 A | 7/2014 |
| JP | 2015-097174 A | 5/2015 |
| JP | 2016-018675 A | 2/2016 |
| JP | 6216368 B2 | 9/2017 |
| WO | WO 2014/103874 A1 | 7/2014 |
| WO | WO 2017/141675 A1 | 8/2017 |

\* cited by examiner

TERMINAL COMPONENT AND SECONDARY BATTERY

BACKGROUND OF THE INVENTION

1. Field of the Invention

The present disclosure relates to a terminal component and a secondary battery. The present application claims priority based on Japanese Patent Application No. 2021-003789 filed on Jan. 13, 2021, and the entire contents of the application are incorporated herein by reference.

2. Description of the Related Art

Japanese Patent Application Publication No. 2013-77546 discloses a secondary battery including a fuse in an electrode terminal. The secondary battery disclosed in this publication includes a portion that functions as a fuse in a current collecting member inside a battery case. It is considered that the portion that functions as a fuse can cut off electrical connection by melting a portion of the fuse that is narrower than the surrounding portions when an overcurrent flows through the current collecting member.

Japanese Patent Application Publication No. 2014-86177 discloses a pressure-type current cutoff device for a sealed battery provided with an inversion plate, the current cutoff device being arranged outside a battery case. It is considered that with the pressure-type current cutoff device disclosed in this publication, the inversion plate deforms in response to a pressure rise inside the battery case, thereby electrically cutting off the inversion plate from a terminal connected to the inversion plate.

SUMMARY OF THE INVENTION

Where a member used for a secondary battery includes a part serving as a fuse, the part serving as a fuse may have a higher electrical resistance than other parts. Therefore, when an electric current flows, the heat quantity generated in the part serving as a fuse can be larger than that in the other parts. The present inventor has found that where a part serving as a fuse is provided inside a battery case, heat may be trapped inside the battery case due to heat generation in that part. As a result, the temperature inside the battery case may rise, an electrolytic solution may be decomposed, and battery performance may be deteriorated.

The present inventor proposes a novel structure that functions as a fuse for a secondary battery.

A terminal component disclosed herein is to be attached to a battery case so that a part of the terminal component is connected to an internal terminal inside the battery case, and a part is exposed to the outside of the battery case, the terminal component including a first metal and a second metal overlapped on the first metal. The first metal has a part to be connected to the internal terminal, and the second metal has a part to be exposed to the outside of the battery case. At an interface where the first metal and the second metal are overlapped, one of the first metal and the second metal has a protrusion having a flat top portion. The other metal is joined to the top portion. A cross section of the protrusion orthogonal to a projection direction of the protrusion is set such that fusing occurs when a current equal to or higher than a predetermined current value flows between the first metal and the second metal.

In such a terminal component, the protrusion of one of the first metal and the second metal functions as a fuse.

The first metal and the second metal may be configured of different metals. The first metal and the second metal may be joined by metal joining at a distal end of the protrusion.

In a secondary battery including a battery case and an electrode terminal attached to the battery case, the electrode terminal may include a part configured of the terminal component described above. The protrusion of the terminal component may be provided on the outside of the battery case.

DESCRIPTION OF THE PREFERRED EMBODIMENTS

Figure 1:
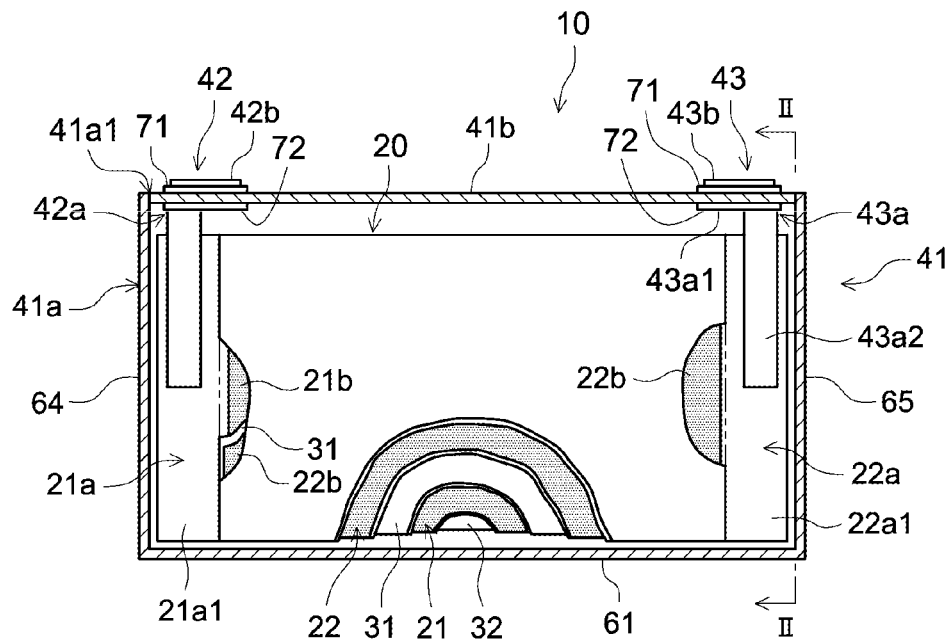
FIG. 1 is a partial cross-sectional view of a lithium ion secondary battery 10.

Hereinafter, an embodiment of the terminal component and secondary battery disclosed herein will be described. The embodiment described herein is, of course, not intended to specifically limit the present disclosure. The present disclosure is not limited to the embodiment described herein, unless otherwise specified. Each drawing is schematically drawn and does not necessarily reflect the actual configuration. In addition, members and parts that perform the same action are designated, as appropriate, by the same reference numerals, and duplicate description thereof will be omitted.

Secondary Battery

In the present description, the "secondary battery" means a device capable of charging and discharging. The secondary battery is inclusive of a battery generally called a lithium ion battery, a lithium secondary battery, or the like, a lithium polymer battery, a lithium ion capacitor, or the like. Here, a lithium ion secondary battery will be illustrated as a form of the secondary battery.

Lithium-Ion Secondary Battery 10

Figure 2:
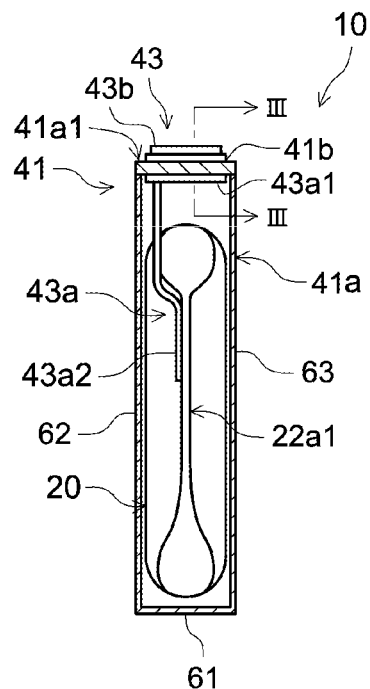
FIG. 2 is a cross-sectional view showing a II-II cross section of FIG. 1.

FIG. 1 is a partial cross-sectional view of a lithium ion secondary battery 10. In FIG. 1, a state in which the inside is exposed is drawn along a wide surface on one side of a substantially rectangular parallelepiped battery case 41. The lithium ion secondary battery 10 shown in FIG. 1 is a so-called sealed battery. FIG. 2 is a cross-sectional view showing a II-II cross section of FIG. 1. In FIG. 2, a partial cross-sectional view of a substantially rectangular parallelepiped battery case 41 in a state where the inside is exposed along a narrow surface on one side is schematically drawn.

As shown in FIG. 1, the lithium ion secondary battery 10 includes an electrode body 20, a battery case 41, a positive electrode terminal 42, and a negative electrode terminal 43.

Electrode Body 20

The electrode body 20 is accommodated in the battery case 41 in a state of being covered with an insulating film (not shown) or the like. The electrode body 20 includes a positive electrode sheet 21 as a positive electrode element, a negative electrode sheet 22 as a negative electrode element, and separator sheets 31 and 32 as separators. The positive electrode sheet 21, the first separator sheet 31, the negative electrode sheet 22, and the second separator sheet 32 are long strip-shaped members, respectively.

In the positive electrode sheet 21, a positive electrode active material layer 21b including a positive electrode active material is formed on both sides of a positive electrode current collecting foil 21a (for example, an aluminum foil) having a predetermined width and thickness, except for a non-formation portion 21a1 that is set to a constant width at one end in the width direction. For example, in a lithium ion secondary battery, the positive electrode active material is a material capable of releasing lithium ions during charging and absorbing lithium ions during discharging, such as a lithium transition metal composite material. Various positive electrode active materials have been generally proposed in addition to the lithium transition metal composite material, and the type of the positive electrode active material is not particularly limited.

In the negative electrode sheet 22, a negative electrode active material layer 22b including a negative electrode active material is formed on both sides of a negative electrode current collecting foil 22a (here, a copper foil) having a predetermined width and thickness, except for a non-formation portion 22a1 that is set to a constant width at one end in the width direction. For example, in a lithium ion secondary battery, the negative electrode active material is a material capable of occluding lithium ions during charging and releasing the occluded lithium ions during discharging, such as natural graphite. Various negative electrode active materials have been generally proposed in addition to natural graphite, and the type of the negative electrode active material is not particularly limited.

For the separator sheets 31 and 32, for example, a porous resin sheet which has a required heat resistance and through which an electrolyte can pass is used. Various separator sheets have been proposed for the separator sheets 31 and 32, and the type thereof is not particularly limited.

Here, the negative electrode active material layer 22b is formed, for example, to be wider than the positive electrode active material layer 21b. The width of the separator sheets 31 and 32 is larger than that of the negative electrode active material layer 22b. The non-formation portion 21a1 of the positive electrode current collecting foil 21a and the non-formation portion 22a1 of the negative electrode current collecting foil 22a are directed to opposite sides in the width direction. Further, the positive electrode sheet 21, the first separator sheet 31, the negative electrode sheet 22, and the second separator sheet 32 are oriented in the length direction, stacked in this order and wound. The negative electrode active material layer 22b covers the positive electrode active material layer 21b with the separator sheets 31 and 32 interposed therebetween. The negative electrode active material layer 22b is covered with separator sheets 31 and 32. The non-formation portion 21a1 of the positive electrode current collecting foil 21a protrudes from one side of the separator sheets 31 and 32 in the width direction. The non-formation portion 22a1 of the negative electrode current collecting foil 22a protrudes from the separator sheets 31 and 32 on the opposite side in the width direction.

As shown in FIG. 1, the above-described electrode body 20 is flattened along one plane including the winding axis so as to be accommodated in the case body 41a of the battery case 41. The non-formation portion 21a1 of the positive electrode current collecting foil 21a is arranged on one side, and the non-formation portion 22a1 of the negative electrode current collecting foil 22a is arranged on the opposite side along the winding axis of the electrode body 20.

Battery Case 41

As shown in FIG. 1, the electrode body 20 is accommodated in the battery case 41. The battery case 41 has a case body 41a having a substantially rectangular parallelepiped angular shape with one side open, and a lid 41b mounted on the opening. In this embodiment, the case body 41a and the lid 41b are formed of aluminum or an aluminum alloy mainly composed of aluminum, from the viewpoint of weight reduction and ensuring the required rigidity.

Case Body 41a

As shown in FIGS. 1 and 2, the case body 41a has a substantially rectangular parallelepiped angular shape with one side open. The case body 41a has a substantially rectangular bottom surface portion 61, a pair of wide surface portions 62 and 63, and a pair of narrow surface portions 64 and 65. Each of the pair of wide surface portions 62 and 63 rises from the long side of the bottom surface portion 61. Each of the pair of narrow surface portions 64 and 65 rises from the short side of the bottom surface portion 61. An opening 41a1 surrounded by a pair of wide surface portions 62 and 63 and a pair of narrow surface portions 64 and 65 is formed on one side surface of the case body 41a.

Lid 41b

The lid 41b is mounted on the opening 41a1 of the case body 41a surrounded by the long sides of the pair of wide surface portions 62 and 63 and the short sides of the pair of narrow surface portions 64 and 65. The peripheral edge of the lid 41b is joined to the edge of the opening 41a1 of the case body 41a. Such joining may be performed by, for example, continuous welding with no gaps. Such welding can be achieved, for example, by laser welding.

In this embodiment, a positive electrode terminal 42 and a negative electrode terminal 43 are attached to the lid 41b. The positive electrode terminal 42 includes an internal terminal 42a and an external terminal 42b. The negative electrode terminal 43 includes an internal terminal 43a and an external terminal 43b. The internal terminals 42a and 43a are attached to the inside of the lid 41b with an insulator 72 interposed therebetween. The external terminals 42b and 43b are attached to the outside of the lid 41b with a gasket 71 interposed therebetween. The internal terminals 42a and 43a extend inside the case body 41a. The internal terminal 42a of the positive electrode is connected to the non-formation portion 21a1 of the positive electrode current collecting foil 21a. The internal terminal 43a of the negative electrode is connected to the non-formation portion 22a1 of the negative electrode current collecting foil 22a.

As shown in FIG. 1, the non-formation portion 21a1 of the positive electrode current collecting foil 21a of the electrode body 20 and the non-formation portion 22a1 of the negative electrode current collecting foil 22a are attached to the internal terminals 42a and 43a that are attached to both sides of the lid 41b in the longitudinal direction. The electrode body 20 is accommodated in the battery case 41 in a state of being attached to the internal terminals 42a and 43a attached to the lid 41b. Here, the wound electrode body 20 is illustrated by way of example. The structure of the electrode body 20 is not limited to such a form. The structure of the electrode body 20 may be, for example, a laminated structure in which a positive electrode sheet and a negative electrode sheet are alternately laminated with a separator sheet interposed therebetween. Further, a plurality of electrode bodies 20 may be accommodated in the battery case 41.

Figure 3:
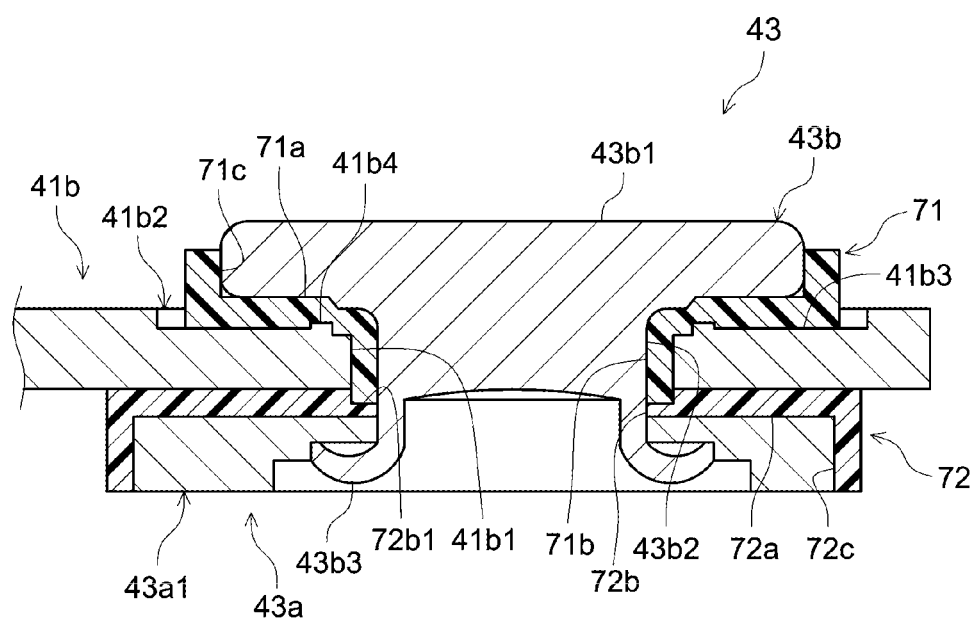
FIG. 3 is a sectional view taken along line III-III of FIG. 2.

FIG. 3 is a sectional view taken along line III-III of FIG. 2. FIG. 3 shows a cross section of a part where the negative electrode terminal 43 is attached to the lid 41b. In this embodiment, a member in which dissimilar metals are joined is used for the external terminal 43b of the negative electrode. In FIG. 3, the cross-sectional shape of the external terminal 43*b* is schematically shown without showing the structure of the metals constituting the external terminal 43*b*, the interface between the dissimilar metals, the gap between the dissimilar metals, or the like.

As shown in FIG. 3, the lid 41*b* has an attachment hole 41*b*1 for attaching the external terminal 43*b* of the negative electrode. The attachment hole 41*b*1 penetrates the lid 41*b* at a predetermined position of the lid 41*b*. The internal terminal 43*a* and the external terminal 43*b* of the negative electrode are attached to the attachment hole 41*b*1 of the lid 41*b* with the gasket 71 and the insulator 72 interposed therebetween. On the outside of the attachment hole 41*b*1, a step 41*b*2 on which the gasket 71 is mounted is provided around the attachment hole 41*b*1. The step 41*b*2 is provided with a seat surface 41*b*3 on which the gasket 71 is arranged. The seat surface 41*b*3 is provided with a projection 41*b*4 for positioning the gasket 71.

Here, as shown in FIG. 3, the external terminal 43*b* of the negative electrode includes a head 43*b*1, a shaft 43*b*2, and a caulking piece 43*b*3. The head 43*b*1 is a part arranged outside the lid 41*b*. The head 43*b*1 is a part that is larger than the attachment hole 41*b*1 and arranged at the gasket 71. The shaft 43*b*2 is a part mounted in the attachment hole 41*b*1 with the gasket 71 interposed therebetween. The shaft 43*b*2 protrudes downward from a substantially central portion of the head 43*b*1. As shown in FIG. 3, the caulking piece 43*b*3 is a part caulked to the internal terminal 43*a* of the negative electrode inside the lid 41*b*. The caulking piece 43*b*3 extends from the shaft 43*b*2 and is bent and caulked to the internal terminal 43*a* of the negative electrode after being inserted into the lid 41*b*.

Gasket 71

As shown in FIG. 3, the gasket 71 is a member attached to the attachment hole 41*b*1 and the seat surface 41*b*3 of the lid 41*b*. In this embodiment, the gasket 71 includes a seat 71*a*, a boss 71*b*, and a side wall 71*c*. The seat 71*a* is apart mounted on the seat surface 41*b*3 provided on the outer surface around the attachment hole 41*b*1 of the lid 41*b*. The seat 71*a* has a substantially flat surface corresponding to the seat surface 41*b*3. The seat 71*a* is provided with a depression corresponding to the projection 41*b*4 of the seat surface 41*b*3. The boss 71*b* projects from the bottom surface of the seat 71*a*. The boss 71*b* has an outer shape along the inner side surface of the attachment hole 41*b*1 so as to be mounted on the attachment hole 41*b*1 of the lid 41*b*. The inner surface of the boss 71*b* serves as a mounting hole for mounting the shaft 43*b*2 of the external terminal 43*b*. The side wall 71*c* rises upward from the peripheral edge of the seat 71*a*. The head 43*b*1 of the external terminal 43*b* is mounted on a part surrounded by the side wall 71*c* of the gasket 71.

The gasket 71 is arranged between the lid 41*b* and the external terminal 43*b* to ensure insulation between the lid 41*b* and the external terminal 43*b*. Further, the gasket 71 ensures the airtightness of the attachment hole 41*b*1 of the lid 41*b*. From this point of view, it is preferable to use a material having excellent chemical resistance and weather resistance. In this embodiment, PFA is used for the gasket 71. PFA is a copolymer of tetrafluoroethylene and perfluoroalkoxyethylene (Tetrafluoroethylene Perfluoroalkylvinylether Copolymer). The material used for the gasket 71 is not limited to PFA.

Insulator 72

The insulator 72 is a member mounted inside the lid 41*b* around the attachment hole 41*b*1 of the lid 41*b*. The insulator 72 includes a base 72*a*, a hole 72*b*, and a side wall 72*c*. The base 72*a* is a part arranged along the inner surface of the lid 41*b*. In this embodiment, the base 72*a* is a substantially flat plate-shaped part. The base 72*a* is arranged along the inner side surface of the lid 41*b*, and has a size such that the base does not protrude from the lid 41*b* so that it can be housed in the case body 41*a*. The hole 72*b* is provided correspondingly to the attachment hole 41*b*1. In this embodiment, the hole 72*b* is provided in a substantially central portion of the base 72*a*. On the side surface of the lid 41*b* facing the inner side surface, a recessed step 72*b*1 is provided around the hole 72*b*. The step 72*b*1 accommodates the distal end of the boss 71*b* of the gasket 71 mounted in the attachment hole 41*b*1. The side wall 72*c* rises downward from the peripheral edge of the base 72*a*. A proximal portion 43*a*1 provided at one end of the internal terminal 43*a* of the negative electrode is accommodated in the base 72*a*. Since the insulator 72 is arranged inside the battery case 41, it is preferable that the insulator 72 have a required chemical resistance. In this embodiment, PPS is used for the insulator 72. PPS is a polyphenylene sulfide resin. The material used for the insulator 72 is not limited to PPS.

The internal terminal 43*a* of the negative electrode includes the proximal portion 43*a*1 and a connection piece 43*a*2 (see FIGS. 1 and 2). The proximal portion 43*a*1 is a part mounted on the base 72*a* of the insulator 72. In this embodiment, the proximal portion 43*a*1 has a shape corresponding to the inside of the side wall 72*c* around the base 72*a* of the insulator 72. As shown in FIGS. 1 and 2, the connection piece 43*a*2 extends from one end of the proximal portion 43*a*1 and extends into the case body 41*a* to be connected to the non-formation portion 22*a*1 of the negative electrode of the electrode body 20.

In this embodiment, the gasket 71 is attached to the outside of the lid 41*b* while the boss 71*b* is being mounted on the attachment hole 41*b*1. The external terminal 43*b* is mounted on the gasket 71. At this time, the shaft 43*b*2 of the external terminal 43*b* is inserted into the boss 71*b* of the gasket 71, and the head 43*b*1 of the external terminal 43*b* is arranged on the seat 71*a* of the gasket 71. The insulator 72 and the internal terminal 43*a* are attached to the inside of the lid 41*b*. As shown in FIG. 3, the caulking piece 43*b*3 of the external terminal 43*b* is bent and caulked to the proximal portion 43*a*1 of the internal terminal 43*a*. The caulking piece 43*b*3 of the external terminal 43*b* and the proximal portion 43*a*1 of the negative electrode terminal 43 may be partially metal-joined in order to improve conductivity.

For the internal terminal 42*a* of the positive electrode of the lithium ion secondary battery 10, the required level of oxidation-reduction resistance is not higher than that of the negative electrode. From the viewpoint of required oxidation-reduction resistance and weight reduction, aluminum can be used for the internal terminal 42*a* of the positive electrode. By contrast, for the internal terminal 43*a* of the negative electrode, the required level of oxidation-reduction resistance is higher than that of the positive electrode. From this point of view, copper may be used for the internal terminal 43*a* of the negative electrode. Meanwhile, as the bus bar to which the external terminal 43*b* is connected, aluminum or an aluminum alloy may be used from the viewpoint of weight reduction and cost reduction.

The present inventor has studied the use of copper or copper alloy for a part of the external terminal 43*b* that is joined to the internal terminal 43*a*, and the use of aluminum or an aluminum alloy for a part of the external terminal 43*b* that is connected to the bus bar. In order to realize such a structure, in this embodiment, a member obtained by dissimilar metal joining of copper and aluminum is used as the external terminal 43b. The structure of the terminal component 200 used as the external terminal 43b will be described hereinbelow.

Terminal Component 200

Figure 4:
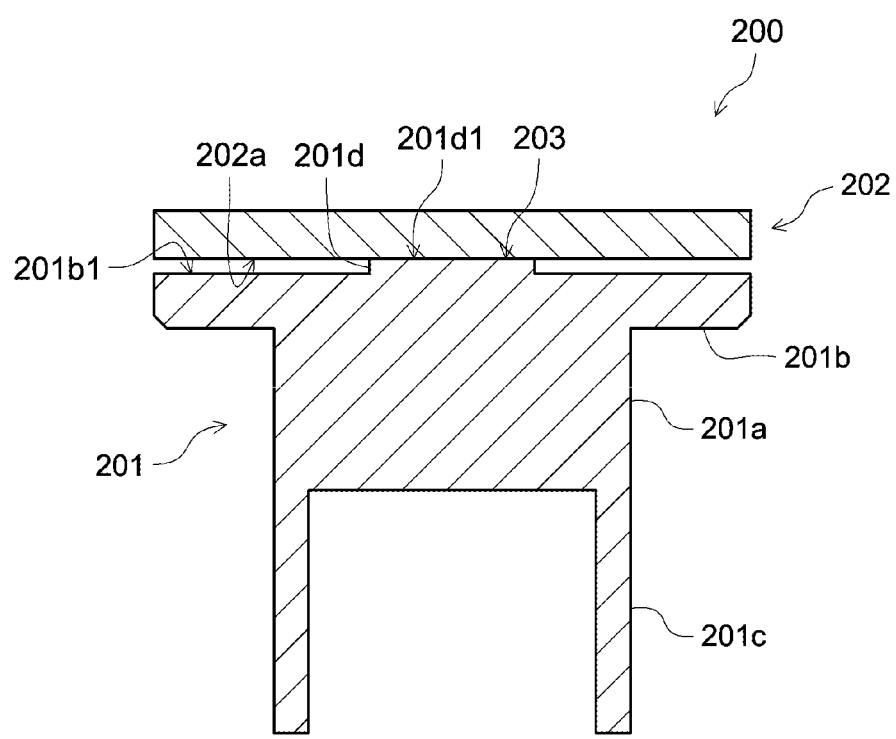
FIG. 4 is a cross-sectional view schematically showing a terminal component 200.

FIG. 4 is a cross-sectional view schematically showing the terminal component 200. As shown in FIGS. 1 and 2, the terminal component 200 is attached to the battery case 41 so that a part of the terminal component is connected to the internal terminal 43a inside the battery case 41, and a part is partially exposed to the outside of the battery case 41.

The terminal component 200 includes a first metal 201 and a second metal 202 overlapped on the first metal 201. A part of the first metal 201 is connected to the internal terminal 43a inside the battery case 41. The second metal 202 is exposed to the outside of the battery case 41. The first metal 201 and the second metal 202 are configured of different metals.

A part of the first metal 201 is connected to the internal terminal 43a inside the battery case 41 when the terminal component 200 is used as the external terminal 43b. In this embodiment, the first metal is configured of copper. The first metal 201 has a shaft 201a and a flange 201b. The shaft 201a is a part serving as the shaft 43b2 to be inserted into the attachment hole 41b1 of the lid 41b. The flange 201b is a substantially rectangular flat plate-shaped part that is provided at one end of the shaft 201a and is wider than the shaft 201a. The shaft 201a is provided with a part 201c that serves as the caulking piece 43b3 that is to be further caulked to the internal terminal 43a on the side opposite to the side where the flange 201b is provided.

The second metal 202 is a part exposed to the outside of the battery case 41 when the terminal component 200 is used as the external terminal 43b. In this embodiment, the second metal is configured of aluminum.

In this embodiment, the first metal 201 includes a protrusion 201d having a flat top portion 201d1. The protrusion 201d is provided at the center of a facing surface 201b1 of the flange 201b. The protrusion 201d is a substantially disk-shaped part.

The second metal 202 is a flat plate-shaped metal member overlapped on the first metal 201. The second metal 202 has a substantially rectangular shape in which the facing surface 202a facing the first metal 201 corresponds to the facing surface 201b1 of the first metal 201.

The second metal 202 is joined to the top portion 201d1 of the protrusion 201d of the first metal 201. In this embodiment, the first metal 201 and the second metal 202 are metal-joined at the top portion 201d1 of the protrusion 201d of the first metal 201. The metal-joined joint portion 203 is formed at the top portion 201d1 and the central portion of the facing surface 202a. The method of joining the top portion 201d1 of the protrusion 201d and the second metal 202 is not particularly limited, and for example, the joining can be performed by a method such as ultrasonic pressure welding, friction welding, resistance welding, and the like. The joint portion 203 joined in this way is formed by solid-phase joining without using an adhesive layer of an adhesive or a solder.

In this embodiment, a region other than the protrusion 201d is a gap between the facing surface 201b1 of the first metal 201 and the facing surface 202a of the second metal 202. However, the region between the facing surface 201b1 and the facing surface 202a is not limited to such a form. A member that does not electrically connect the first metal 201 and the second metal 202 may be arranged in the region. For example, when a vibration is applied to the lithium ion secondary battery 10, the vibration may be transmitted to the terminal component 200 via a bus bar. In order to alleviate the concentration of such an external load on the protrusion 201d, for example, a gasket 71 or the like may be arranged in the region. Such a member that does not electrically connect the first metal 201 and the second metal 202 may be partially or entirely arranged in the region.

When the lithium ion secondary battery 10 is charged or discharged, a current flows through the terminal component 200 used as the external terminal 43b. At this time, a current also flows through the first metal 201 and the second metal 202. As shown in FIG. 4, the protrusion 201d of the first metal 201 has a narrower cross-sectional area through which an electric current passes than surrounding portions. As a result, when a current flows through the terminal component 200 due to charging or discharging of the lithium ion secondary battery 10, the current is concentrated in the protrusion 201d. In this way, the amount of Joule heat generated in the portion where the current is concentrated is larger than in the other portions. Further, the joint portion 203 is formed with a dissimilar metal joint in which the first metal 201 and the second metal 202 are joined. Therefore, when a current flows through the terminal component 200, the amount of Joule heat generated in in the protrusion 201d and the joint portion 203 is larger than in the surrounding portions.

Here, the cross section of the protrusion 201d that is orthogonal to the projection direction of the protrusion 201d is set such that fusing occurs when a current equal to or higher than a predetermined current value flows between the first metal 201 and the second metal 202. Here, the projection direction is a direction perpendicular to the facing surface 201b1 provided with the protrusion 201d.

Here, the predetermined current value is set based on, for example, a peak current value in the normal usage mode of the battery. Although not limited to this, the predetermined current value can be set to twice or more the above-mentioned peak current value.

Fusing occurring when a current equal to or higher than the predetermined current value flows is, for example, a process in which one of the first metal 201 and the second metal 202 is melted, thereby electrically separating the first metal and the second metal from each other in the protrusion.

The fusing referred to herein may occur when the protrusion 201d reaches the melting point and melts, or when the protrusion 201d does not melt and the other second metal 202 melts at the joint portion 203.

Since the cross section of the protrusion 201d orthogonal to the projection direction is set to such a cross section, the protrusion 201d functions as a fuse that cuts off the electrical connection of the first metal 201 and the second metal 202 when an overcurrent occurs.

In the terminal component 200 disclosed herein, the dimensions of the protrusion 201d that functions as a fuse can be set, as appropriate, according to the assumed overcurrent, metal types of the first metal 201 and the second metal 202, and the like. An example will be described below.

Described hereinbelow is the setting of the dimensions of the protrusion 201d when a cut-off current is 940 A and an energizing time is 100 sec. The first metal 201 having the disk-shaped protrusion 201d is configured of copper, and the second metal 202 is configured of aluminum. A case will be considered in which the second metal 202, which has a melting point lower than that of the first metal 201, melts when the above-mentioned current flows through the protrusion 201d of the first metal 201.

First, the conditions under which the second metal 202, which has a melting point lower than that of the first metal 201, melts will be considered. The heat quantity $Q_m$ required for the second metal 202 to melt is represented by $Q_m$=m× c×ΔT by using the mass m, the specific heat c, and the temperature difference ΔT.

The melting point of aluminum constituting the second metal 202 is 660.3° C. When the room temperature is 25° C., the temperature difference ΔT required to melt the second metal 202 is 635.3° C. The specific gravity ρ of aluminum is 2.7 g/cm³. The specific heat c of aluminum is 0.9 J/(g·° C.). Let S be the area of the joint portion 203. In this embodiment, in the joint portion 203, the second metal of 0.1 mm is melted, and the first metal 201 and the second metal 202 are disconnected.

The heat quantity $Q_m$ for melting the second metal 202 is expressed by the following formula.

$$Q_m = S \times 0.1 \text{ (mm)} \times 2.7 \text{ (g/cm}^3\text{)} \times 0.9 \text{ (J/(g·° C.))} \times 635.3 \text{(° C.)}$$

Next, the Joule heat generated at the protrusion 201d of the first metal 201 will be considered. The Joule heat $Q_h$ generated at the protrusion 201d of the first metal 201 is represented by $Q_h$=R×I²×t by using the resistance value R, the current value I, and the energization time t.

As described above, the assumed current value I is 940 A. The energization time t is 100 sec. The resistance value R is represented by R=$\rho_v$×L/S by using the volume resistivity $\rho_v$, the length L through which the current flows, and the cross-sectional area S through which the current flows. For example, at 20° C., the volume resistivity $\rho_v$ of copper constituting the first metal 201 is 1.69 μΩ·cm. The length L through which the current flows is the height of the protrusion 201d.

The Joule heat $Q_h$ generated at the protrusion 201d of the first metal 201 is expressed by the following formula.

$$Q_h = 1.69 \text{ (μΩ·cm)} \times L/S \times (940 \text{ (Å)})^2 \times 100 \text{ (sec)}$$

When the Joule heat $Q_h$ generated at the protrusion 201d of the first metal 201 is higher than the heat quantity $Q_m$ required for melting the second metal 202, fusing occurs at the protrusion 201d. That is, the cross-sectional area and height of the protrusion 201d of the first metal 201 can be set so as to satisfy $Q_m < Q_h$.

For example, the height of the protrusion 201d of the first metal 201 can be 0.1 mm and the diameter can be 6 mm. At this time, when the above current flows, a Joule heat of 5.3 J is generated at the protrusion 201d, and the second metal 202 in contact with the protrusion 201d is melted to cause fusing.

Contact resistance is generated in the joint portion 203 because the joining interface is obtained by joining dissimilar metals. Further, as the temperature of the first metal 201 rises, the volume resistivity of the protrusion 201d rises. That is, more Joule heat can be generated at the joint portion 203 than in the above calculation. For example, the dimensions of the protrusion 201d may be adjusted, as appropriate, by using computer simulation or by performing a preliminary test using a sample simulating the structure of the terminal component 200.

The terminal component 200 proposed herein is provided with a protrusion 201d at the joining interface between the first metal 201 and the second metal 202. The first metal 201 and the second metal 202 are joined at the top portion 201d1 of the protrusion 201d. As described above, the cross section of the protrusion 201d that is orthogonal to the projection direction of the protrusion 201d is set in at least a part thereof such that fusing occurs when a current equal to or higher than a predetermined current value flows. In this case, the terminal component 200 is fused when a current equal to or higher than a predetermined current value flows. Therefore, the terminal component 200 can have a function as a fuse.

The protrusion 201d may be configured to be provided outside the battery case 41. With this configuration, even when the current is concentrated in the protrusion 201d and a large Joule heat is generated as compared with the surroundings, the temperature inside the battery case 41 is not affected. Therefore, as compared with the case where a fuse is provided inside the battery case 41, it is possible to suppress the decomposition of an electrolytic solution inside the battery case 41 due to the heat generated by the protrusion 201d. In other words, it is possible to suppress deterioration of battery performance due to heat generation in a part that functions as a fuse.

In the terminal component 200 disclosed herein, the first metal 201 and the second metal 202 may be configured of different metals. For example, by configuring the first metal 201 of the same metal type as the metal type of the bus bar, the joining strength between the first metal 201 and the joining interface of the bus bar can be increased. By using the same metal type as the internal terminal 43a for the second metal 202, the joining strength between the second metal 202 and the internal terminal 43a can be increased. In this way, by using dissimilar metals for the first metal 201 having a part connected to the internal terminal and the second metal 202 having a part exposed to the outside of the battery case, it is possible to exclude the possibility of a dissimilar metal joint location being provided at the bus bar joining interface outside the battery case.

A metal joint made of dissimilar metals is formed at the joint portion 203 in which different metals are joined. Such a joint portion has a higher electrical resistance than a joint portion composed of the same type of metal or a portion formed by thinning a part of one type of metal. Greater Joule heat is generated at the joint portion 203 where different metals are joined. When the terminal component 200 configured of different metals and a terminal component configured of the same metal are set to the same cut-off current, the protrusion 201d of the terminal component 200 configured of different metals can have a thicker and shorter shape. In other words, it is possible to realize stronger mechanical strength while imparting a fuse function to the protrusion 201d.

In the terminal component 200 disclosed herein, the first metal 201 and the second metal 202 are metal-joined at the top portion 201d1 of the protrusion. The first metal 201 and the second metal 202 are joined by so-called solid-phase joining without interposing an intermediate layer such as a solder or a brazing material. By joining the first metal 201 and the second metal 202 without interposing an intermediate layer in this way, good conduction between the first metal 201 and the second metal 202 is ensured during normal use of the battery as well.

In the above-described embodiment, the first metal 201 includes the protrusion 201d, but this embodiment is not limiting. The second metal may have a protrusion having a flat top portion, and the first metal may be joined to the protrusion. At this time, the surface of the first metal facing the second metal is preferably a flat surface.

In the above-described embodiment, the protrusion has a disk shape, but this embodiment is not limiting. The protrusion may be a polygonal flat plate-shaped part such as a quadrangular prism. Further, the cross-sectional shape and area of the protrusion do not have to be constant. The cross section of the protrusion may be tapered from the proximal end of the protrusion toward the top portion. The cross section of the protrusion may be thickened from the proximal end of the protrusion toward the top portion.

The terminal component and secondary battery disclosed herein have been described in various ways. Unless otherwise specified, the embodiments of the terminal component and battery mentioned herein do not limit the present disclosure. Further, the secondary battery disclosed herein can be variously modified, and constituent elements thereof and processes referred to herein can be omitted, as appropriate, or combined, as appropriate, unless a specific problem occurs.

What is claimed is:

1. A terminal component that is to be attached to a battery case so that a part of the terminal component is connected to an internal terminal inside the battery case, and a part is exposed to an outside of the battery case, the terminal component comprising:
   a first metal and
   a second metal overlapped on and in direct contact with the first metal, wherein
   the first metal has a part to be connected to the internal terminal, and the second metal has a part to be exposed to the outside of the battery case,
   at a planar interface where the first metal and the second metal are overlapped and in direct contact with each other,
   one of the first metal and the second metal has a protrusion having a flat top portion at a distal end of the protrusion, and the other of the first metal and the second metal is joined directly to the flat top portion along the planar interface,
   a cross section of the protrusion orthogonal to a projection direction of the protrusion is set such that fusing occurs when a current equal to or higher than a predetermined current value flows between the first metal and the second metal,
   the first metal and the second metal are configured of different metals, and
   the first metal and the second metal are metal-joined at the distal end of the protrusion.

2. A secondary battery comprising:
   a battery case and
   an electrode terminal attached to the battery case, wherein the electrode terminal includes a terminal component according to claim 1.

3. The secondary battery according to claim 2, wherein the protrusion of the terminal component is provided outside the battery case.

* * * * *